(12) United States Patent
Ruedisueli et al.

(10) Patent No.: US 9,004,525 B2
(45) Date of Patent: Apr. 14, 2015

(54) CO-EXTRUDED INFLATABLE CURTAIN DEPLOYMENT RAMP

(75) Inventors: Kevin L. Ruedisueli, Oxford, MI (US); Darin K. Hill, Imlay City, MI (US); Jennifer J. Kowalak, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 996 days.

(21) Appl. No.: 12/492,415

(22) Filed: Jun. 26, 2009

(65) Prior Publication Data

US 2010/0327563 A1    Dec. 30, 2010

(51) Int. Cl.
*B60R 21/16* (2006.01)
*B60R 21/213* (2011.01)
*B60R 21/215* (2011.01)
*B60R 21/217* (2011.01)
*B60R 21/232* (2011.01)

(52) U.S. Cl.
CPC .............. *B60R 21/213* (2013.01); *B60R 21/215* (2013.01); *B60R 21/2171* (2013.01); *B60R 21/232* (2013.01)

(58) Field of Classification Search
USPC ................................ 280/728.2, 728.3, 730.2
See application file for complete search history.

(56) References Cited

U.S. PATENT DOCUMENTS

| | | | | |
|---|---|---|---|---|
| 5,407,227 A | * | 4/1995 | Lauritzen et al. | 280/728.1 |
| 5,647,608 A | * | 7/1997 | Damman et al. | 280/728.2 |
| 5,791,680 A | * | 8/1998 | Dyer | 280/728.3 |
| 5,921,575 A | | 7/1999 | Kretschmer et al. | |
| 5,931,489 A | * | 8/1999 | Damman et al. | 280/728.2 |
| 5,988,677 A | * | 11/1999 | Adomeit et al. | 280/740 |
| 6,079,732 A | | 6/2000 | Nakajima et al. | |
| 6,305,707 B1 | | 10/2001 | Ishiyama et al. | |
| 6,834,883 B2 | * | 12/2004 | Visconti et al. | 280/728.2 |
| 7,182,366 B2 | | 2/2007 | Enriquez | |
| 2005/0173902 A1 | | 8/2005 | Boxey | |

* cited by examiner

*Primary Examiner* — Toan To
(74) *Attorney, Agent, or Firm* — Tarolli, Sundheim, Covell & Tummino LLP

(57) ABSTRACT

An apparatus (10) helps to protect an occupant (13) of a vehicle (12) that has a roof (18), a side structure (16), and a trim piece (310) overlying the side structure (16). The apparatus (10) includes an inflatable curtain (14) that is inflatable away from the vehicle roof (18) to a position adjacent the side structure (16) of the vehicle (12). A deployment ramp (200) includes a mounting member (202) that helps to support the inflatable curtain (14) in a stored condition. A deployment member (220) helps to direct the inflatable curtain (14) to deploy inboard of the trim piece (310). A co-extruded joint interconnects the mounting member (202) and the deployment member (220).

26 Claims, 6 Drawing Sheets

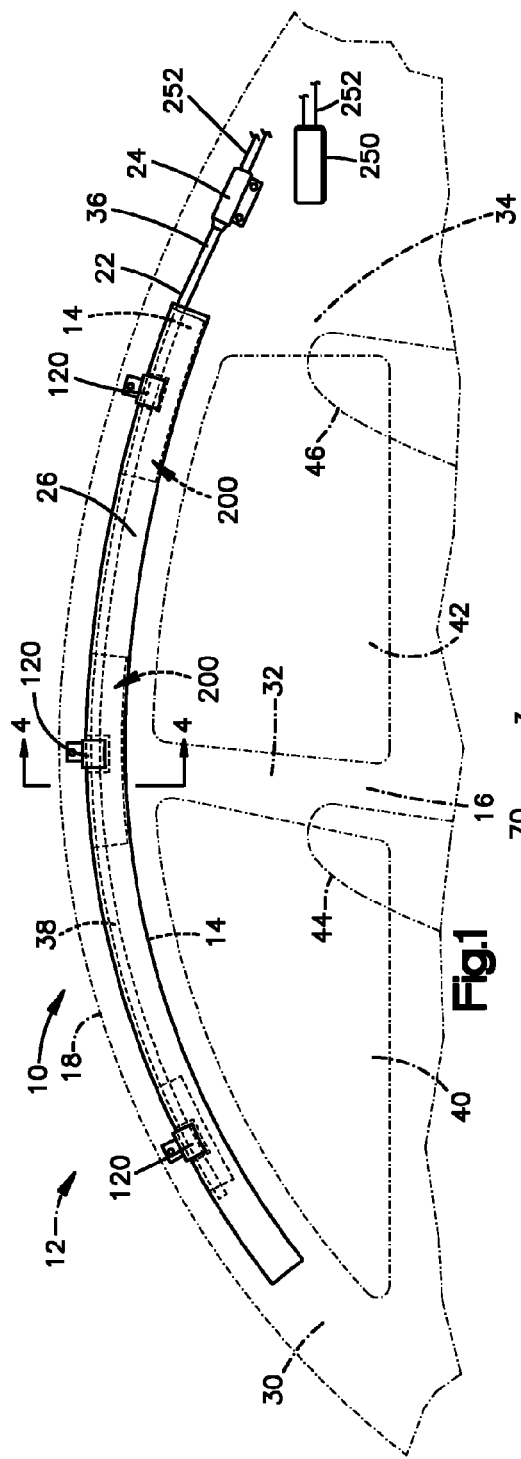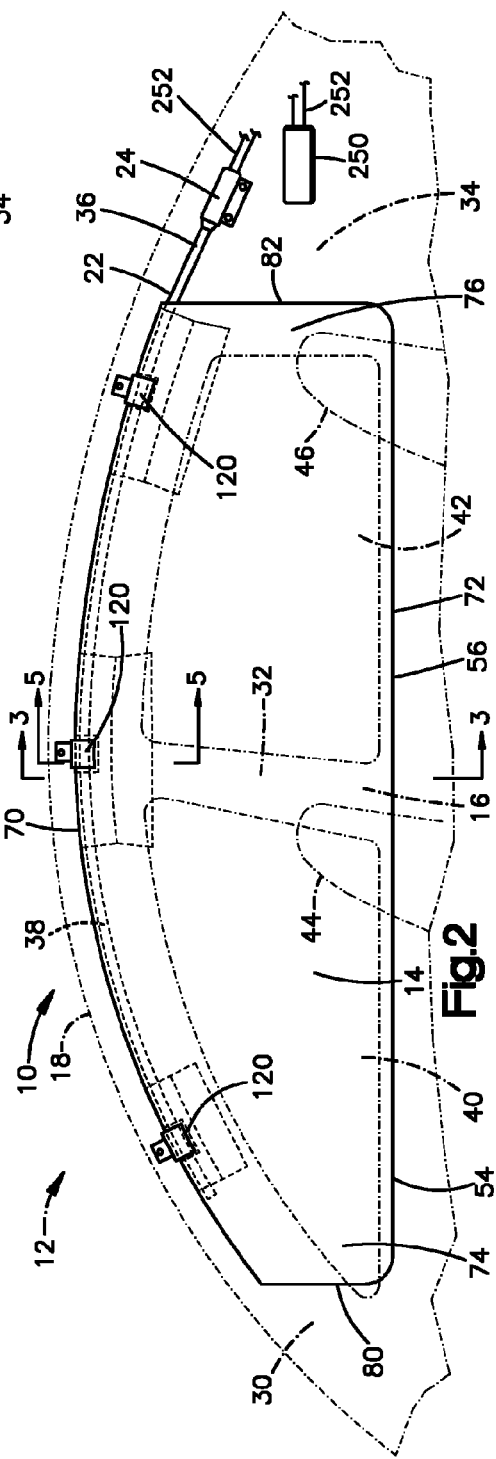

CO-EXTRUDED INFLATABLE CURTAIN DEPLOYMENT RAMP

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant. One particular type of inflatable vehicle occupant protection device is an inflatable curtain. The inflatable curtain is inflatable away from the roof of the vehicle between a vehicle occupant and the side structure of the vehicle in response to a side impact to the vehicle and/or a vehicle rollover. A known inflatable curtain is inflated from a deflated condition with inflation fluid directed from an inflator to the inflatable curtain.

SUMMARY OF THE INVENTION

The present invention relates to an apparatus for helping to protect an occupant of a vehicle that has a roof, a side structure, and a trim piece overlying the side structure. The apparatus includes an inflatable curtain that is inflatable away from the vehicle roof to a position adjacent the side structure of the vehicle. A deployment ramp includes a mounting member that helps to support the inflatable curtain in a stored condition. A deployment member helps to direct the inflatable curtain to deploy inboard of the trim piece. A co-extruded joint interconnects the mounting member and the deployment member.

The present invention also relates to an apparatus for helping to protect an occupant of a vehicle that has a roof, a side structure, and a trim piece overlying the side structure. The apparatus includes an inflatable curtain that is inflatable away from the vehicle roof to a position adjacent the side structure of the vehicle. A deployment ramp includes a mounting member including a support portion that has first and second longitudinal edges. A fastening portion is secured to the second longitudinal edge of the support portion. The fastening portion is stitched to the inflatable curtain. The support portion includes a projection between the first and second longitudinal edges that secures the deployment ramp to the vehicle. The deployment ramp further includes a deployment member that directs the inflatable curtain to deploy inboard of the trim piece. A joint includes co-extruded portions of the mounting member and the deployment member to interconnect the mounting member and the deployment member.

The present invention further relates to a deployment ramp for an inflatable curtain. The deployment ramp includes a first portion constructed with a first material, a second portion constructed with a second material different than the first material, and a joint interconnecting the first and second portions. The joint includes co-extruded portions of the first and second portions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated and stored condition in a vehicle, according the present invention;

FIG. 2 is a schematic view of the apparatus of FIG. 1 in an inflated condition in the vehicle;

DESCRIPTION OF THE EMBODIMENT

Figure 3:
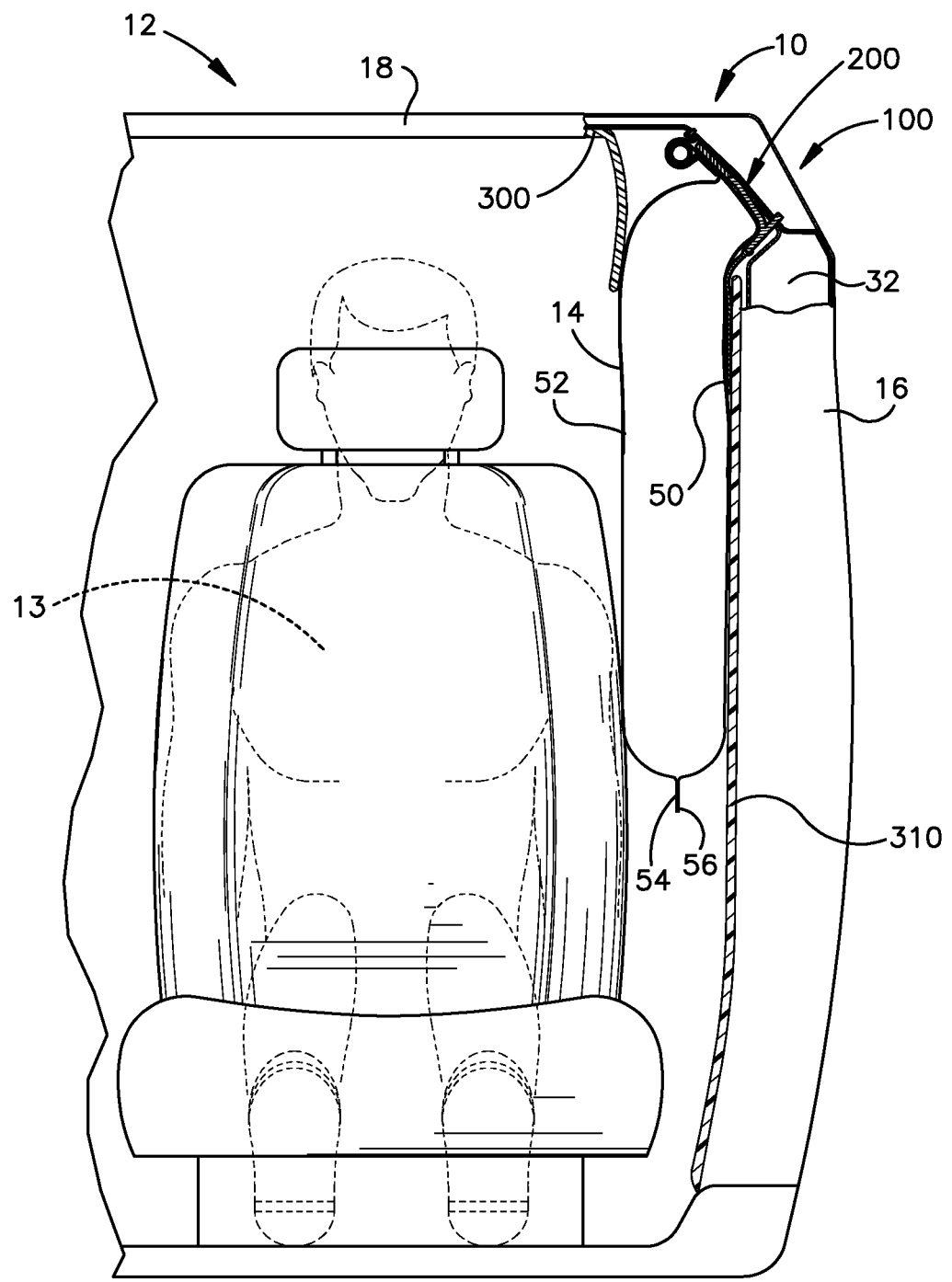
FIG. 3 is a sectional view taken generally along line 3-3 in FIG. 2.

Representative of the present invention, an apparatus 10 helps to protect an occupant 13 of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42.

An inflator 24 is connected in fluid communication with the inflatable curtain 14 through a fill tube 22. The fill tube 22 may be constructed of any suitable material, such as metal or plastic. The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 may include a cover 26 (FIG. 1), such as a fabric sheath or plastic housing, that helps support the inflatable curtain 14 in a stored and deflated condition. The deflated inflatable curtain 14 and the cover 26 have an elongated configuration and extend along the vehicle roof 18 and along the side structure 16 of the vehicle 12 above the side windows 40 and 42. The fill tube 22, inflatable curtain 14, and cover 26 are connected to the vehicle 12 by support clips 120.

The inflatable curtain 14 (FIG. 3) includes panels 50 and 52 of material that are arranged in an overlying manner. Overlapping portions of the panels 50 and 52 are interconnected along at least a portion of a perimeter 54 of the inflatable curtain 14 to form a perimeter connection 56 of the curtain. The perimeter connection 56 helps define an inflatable volume of the inflatable curtain 14. The inflatable curtain 14 may also include interior connections (not shown) in which the overlying panels 50 and 52 are interconnected within the perimeter 54 to form non-inflatable portions that help define inflatable chambers of the curtain.

The inflatable curtain 14 may be formed in a variety of manners, such as by weaving the overlying panels 50 and 52 in a one piece woven construction, stitching the panels together, or interconnecting the panels via ultrasonic welding, heat bonding, or adhesives. In a one piece woven construction, the overlying panels 50 and 52 may be woven simultaneously from a material, such as nylon yarn. The inflatable curtain 14 may be coated with a gas impermeable material, such as urethane, or laminated with a gas impermeable film. The inflatable curtain 14 thus may have a substantially gastight construction. Those skilled in the art will appreciate that alternative materials, such as polyester yarn, and alternatives coatings, such as silicone, may also be used to construct the inflatable curtain 14.

The perimeter 54 of the inflatable curtain 14 is defined at least partially by an upper edge 70, an opposite lower edge 72 of the curtain, and front and rear portions 74 and 76, respectively, of the inflatable curtain spaced apart horizontally along the upper and lower edges. The front and rear portions 74 and 76 of the inflatable curtain 14 include front and rear edges 80 and 82, respectively, that are spaced horizontally apart along the upper and lower edges 70 and 72 and extend between the upper and lower edges.

Figure 4:
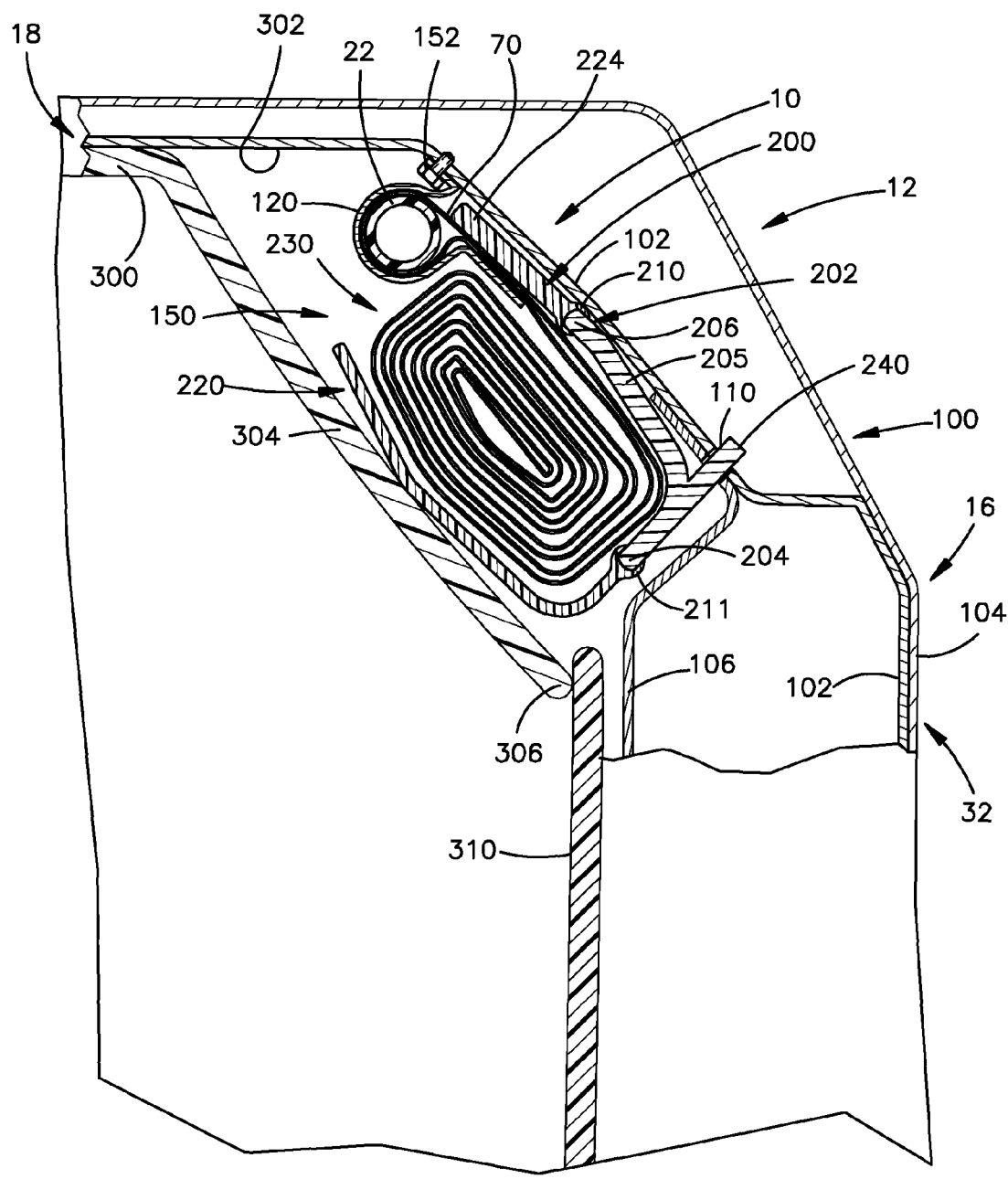
FIG. 4 is a sectional view taken generally along line 4-4 in FIG. 1.
Figure 5:
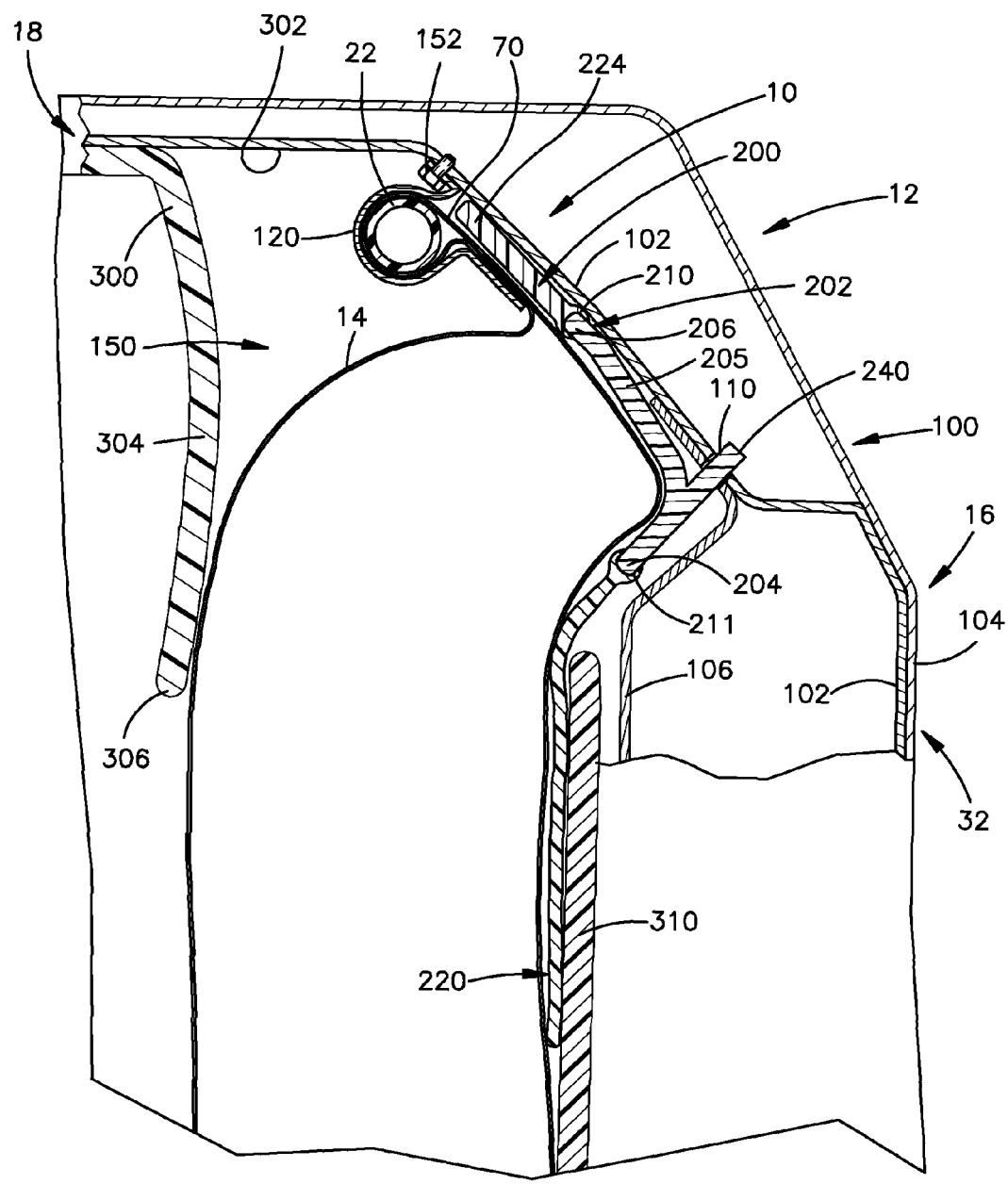
FIG. 5 is a sectional view taken generally along line 5-5 in FIG. 2.

As illustrated in FIGS. 3-5, a vehicle roof rail 100 is located at the intersection of the side structure 16 of the vehicle 12 and the vehicle roof 18. The side structure 16, roof 18, and roof rail 100 are formed from pieces of sheet metal that are stamped or otherwise formed into predetermined shapes and welded or otherwise connected to form a desired structure. As best shown in FIGS. 4 and 5, inner and outer pieces of sheet metal 102 and 104, respectively, are used to form the side structure 16, roof 18, and roof rail 100. A third piece of sheet metal 106 helps to form the B pillar 32 of the vehicle 12. Those skilled in the art will, however, appreciate that the side structure 16, roof 18, roof rail 100, and B pillar 32 may have alternative constructions.

In the illustrated embodiment, the inflatable curtain 14, fill tube 22, cover 26 (not shown), and support clips 120 are assembled as a module 150 that can be installed in the vehicle 12 as a unit. The module 150 is connected to the vehicle 12 by fastening means 152, such as a bolt or screw. The module 150 also includes a deployment ramp 200 positioned adjacent the roof rail 100 and the B pillar 32, as illustrated in FIGS. 4-5. The module 150 may also include a deployment ramp 200 positioned adjacent the roof rail 100 and the A-pillar 30, the C-pillar 34 or both the A-pillar and the C-pillar (FIG. 1). The deployment ramp 200 helps maintain the inflatable curtain 14 in a stowed condition within the cover 26 and helps direct deployment of the inflatable curtain. The inflatable curtain 14, when in the stowed condition, can be rolled, folded, or a combination of rolled and folded. The module 150 may include means (not shown), such as a strap or tether with a tear seam, for holding the deployment ramp 200 in a stored position illustrated in FIG. 4.

Figure 6A:
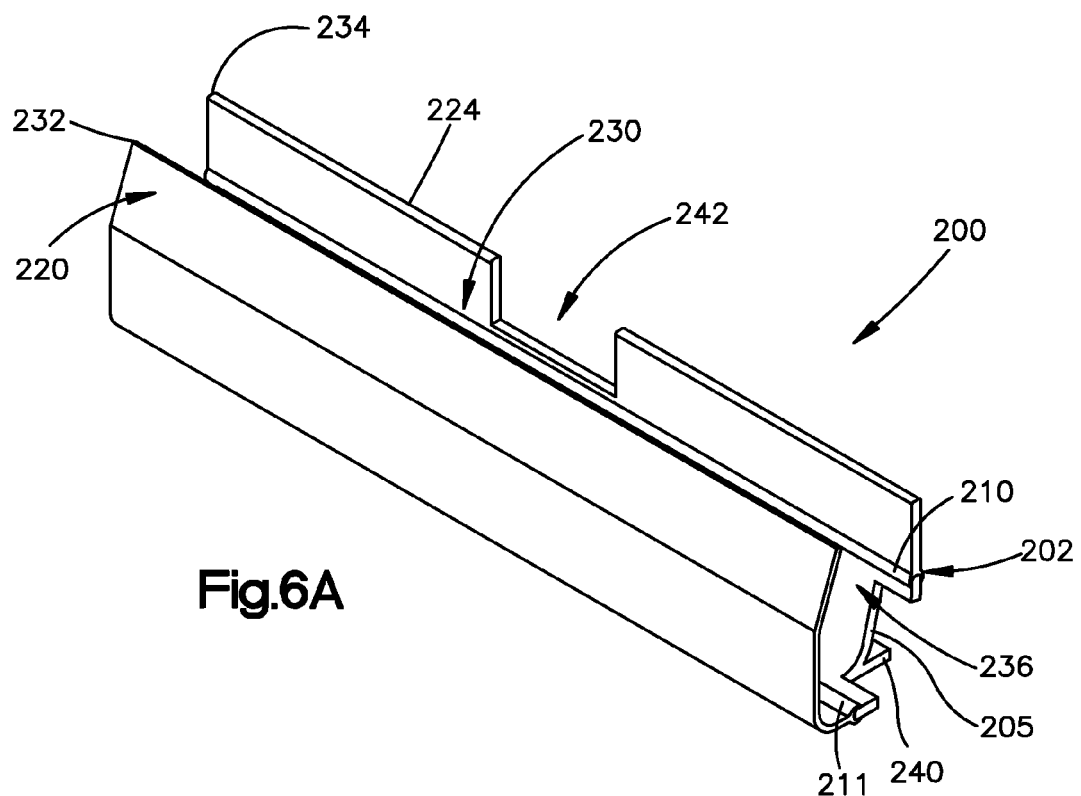
FIG. 6A is a schematic view of a deployment ramp of the apparatus of FIG. 4.
Figure 6B:
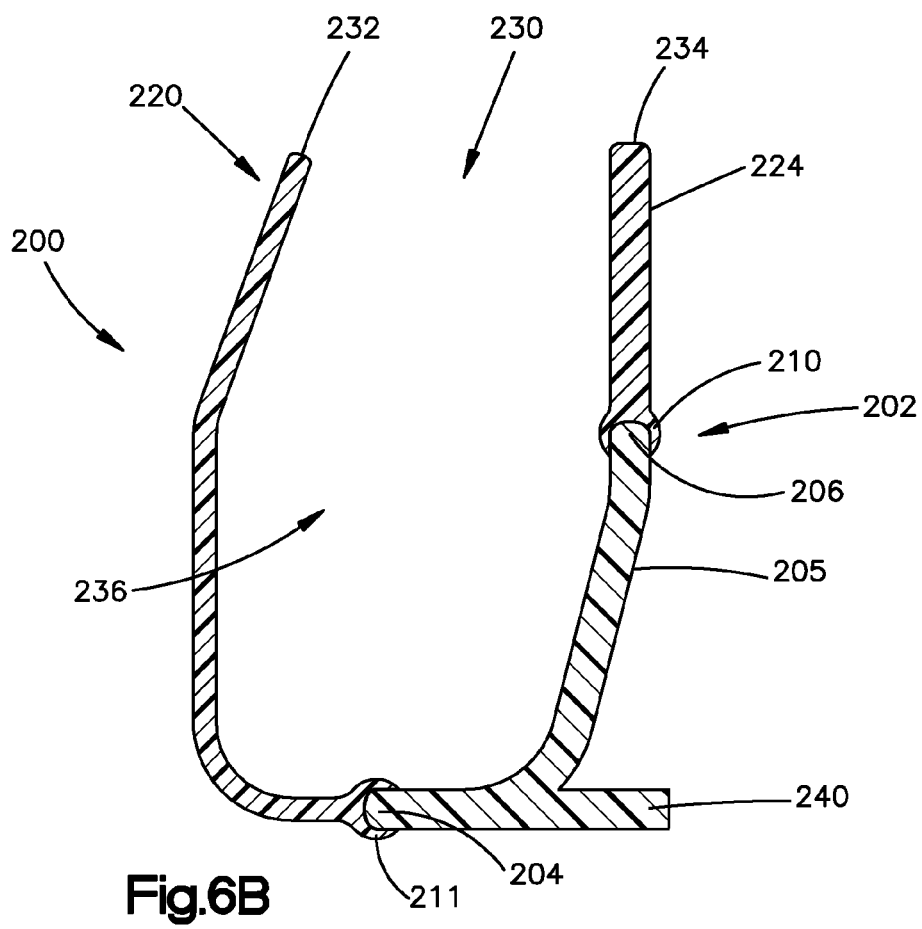
FIG. 6B is a sectional view of the deployment ramp of FIG. 6A.

In the embodiment illustrated in FIGS. 4-6, the support clips 120 for mounting the inflatable curtain 14, the fill tube 22, the cover 26 (not shown in FIGS. 4-6, see FIG. 1), and the deployment ramp 200 to the vehicle 12 have a generally U-shaped construction. Those having skill in the art, however, will appreciate that the clips 120 may have a variety of shapes or configurations designed to accommodate a particular construction of the vehicle 12, the module 150, or the vehicle and the module. The support clips 120 have at least one fastener receiving aperture (not shown) for receiving one of the fasteners 152. The support clip 120 is constructed with a high-strength material, such as metal. Alternative materials, such as plastics or composites, and alternative constructions could also be used to form the support clips 120.

The deployment ramp 200 includes a mounting member 202 for securing the deployment ramp to the vehicle 12 and a deployment member 220 for directing the deployment of the inflatable curtain 14. The deployment ramp 200 may have a variety of shapes or configurations to accommodate a particular construction of the vehicle 12, the module 150 or both the vehicle and the module. In the embodiment illustrated in FIGS. 6A-B, the deployment ramp 200 has a generally U-shaped configuration that defines a channel 236 that extends the length of the deployment ramp. In a pre-deployment condition, the inflatable curtain 14 is received and stowed in the channel 236. An elongated opening 230 is defined between upper edges 232 and 234 of the deployment ramp 200 and extends the length of the deployment ramp. The opening 230 thus provides access to the channel 236.

The mounting member 202 includes a support portion 205 for helping to support the inflatable curtain 14 in the stowed condition. The support portion 205 has a generally L-shaped configuration and includes a first longitudinal edge portion 204 and a second longitudinal edge portion 206. The support portion 205 may also include a projection 240. To install the module 150 in the vehicle 12, the projection 240 may act as or be in the form of a hook or clip for cooperating with an opening 110 in the inner sheet metal piece 102 to help initially support the module 150 in the vehicle while the fasteners 152 are installed.

The mounting member 202 may also include a fastening portion 224 that is secured to the second edge portion 206 of the support portion 205 at a connection 210 that extends the length of the deployment ramp 200. The fastening portion 224 is configured to help secure the deployment ramp 200 to the vehicle 12. The fastening portion 224 includes the upper edge 234, which cooperates with the upper edge 232 to define the opening 230 in the deployment ramp.

In an alternative construction, the fastening portion 224 may be omitted, in which case the support portion 205 would define the upper edge 234 of the deployment ramp 200. In this instance, those having ordinary skill will appreciate that the height of the support may be increased (vertically as viewed in FIG. 6B) such that the upper edge 234, now defined by the second edge portion 206, is positioned similarly or identically to the position of the upper edge 234 shown in FIG. 6B.

The deployment member 220 is secured to the first edge portion 204 of the support portion 205 at a connection 211 that extends the length of the deployment ramp 200. The deployment member 220 is configured to help direct deployment of the inflatable curtain 14. The deployment member 220 includes the upper edge 232 that cooperates with the upper edge 234 to help define the opening 230 in the deployment ramp 200. Accordingly, the deployment member 220 and the fastening portion 224 of the mounting member 202 are positioned on opposite sides of the channel 236.

According to the present invention, the support portion 205 of the mounting member 202 is formed from a material that is different from the material from which the deployment member 220 and the fastening portion 224 are formed. The support portion 205, fastening portion 224, and deployment member 220 are co-extruded such that the support portion, fastening portion, and deployment member are simultaneously formed from their respective materials and bonded together along their respective connections 210 and 211. The deployment ramp 200 is thus formed in a single operation.

The support portion 205 is constructed of a generally rigid material that offers resistance to bending, twisting, or otherwise changing shape. The deployment member 220 and fastening portion 224 are constructed of materials that permit a certain desired degree of bending, twisting or otherwise changing shape. The support portion 205 is thus constructed of a material that is generally more rigid than the material used to construct the deployment member 220 and the fastening portion 224. For example, the support portion 205 may be constructed of a rigid polypropylene (PP) material that may be reinforced with fiber, a filler, such as calcium carbonate, or both fiber and a filler. On the other hand, the deployment member 220 and the fastening portion 224 may be constructed of a thermoplastic olefinic elastomer (TPO), such as that sold under the tradename DEXFLEX® E756 by LyondellBasell Advanced Polyolefins USA Inc. of Cincinnati, Ohio.

In addition to being formed of different materials, the support portion 205, fastening portion 224, and deployment member 220 may have respective configurations selected to provide desired performance characteristics. For example, the support portion 205 may have a configuration, such as a relatively thick or ribbed configuration, that helps enhance the rigidity of the mounting member 202. Likewise, either or both the deployment member 220 and the fastening portion 224 may have a configuration, such as a relatively thin configuration, a non-reinforced configuration, or both, that helps enhance the flexibility of the deployment member and the fastening portion.

The co-extruded, multi-material construction of the deployment ramp 200 is advantageous for several reasons. With conventional one-piece molded deployment ramps, since a single material is used, the material must be sufficiently flexible along the deployment portion and sufficiently rigid and strong at the mounting portion to perform as desired. Therefore, for conventional deployment ramps, a flexible material is chosen for the entire deployment ramp. To provide enhanced material strength and rigidity to the mounting portion either extra material is added to the mounting portion or reinforcing structure, such as ribs, is built along the mounting portion.

From this, those skilled in the art will appreciate that meeting performance criteria with a conventional one-piece, single material deployment ramp can be an expensive proposition. The deployment ramp 200 of the present invention, on the other hand, having a co-extruded multiple material construction, allows for the use of less expensive materials where permissible. For example, the mounting member 202 may be constructed of material that is less expensive than the material used to construct the deployment member 220. The mounting member 202 may thus be sufficiently strong and rigid, and the deployment member 220 sufficiently flexible and resilient, while at the same time reducing overall material costs. The mounting member 202 and the deployment member 220 can therefore both be made from materials that meet respective performance criteria without the need to include additional structure or otherwise increase the amount of material required. This material cost savings is not offset by additional manufacturing steps because the deployment ramp 200 is co-extruded and thereby produced in a single manufacturing step.

Figure 6C:
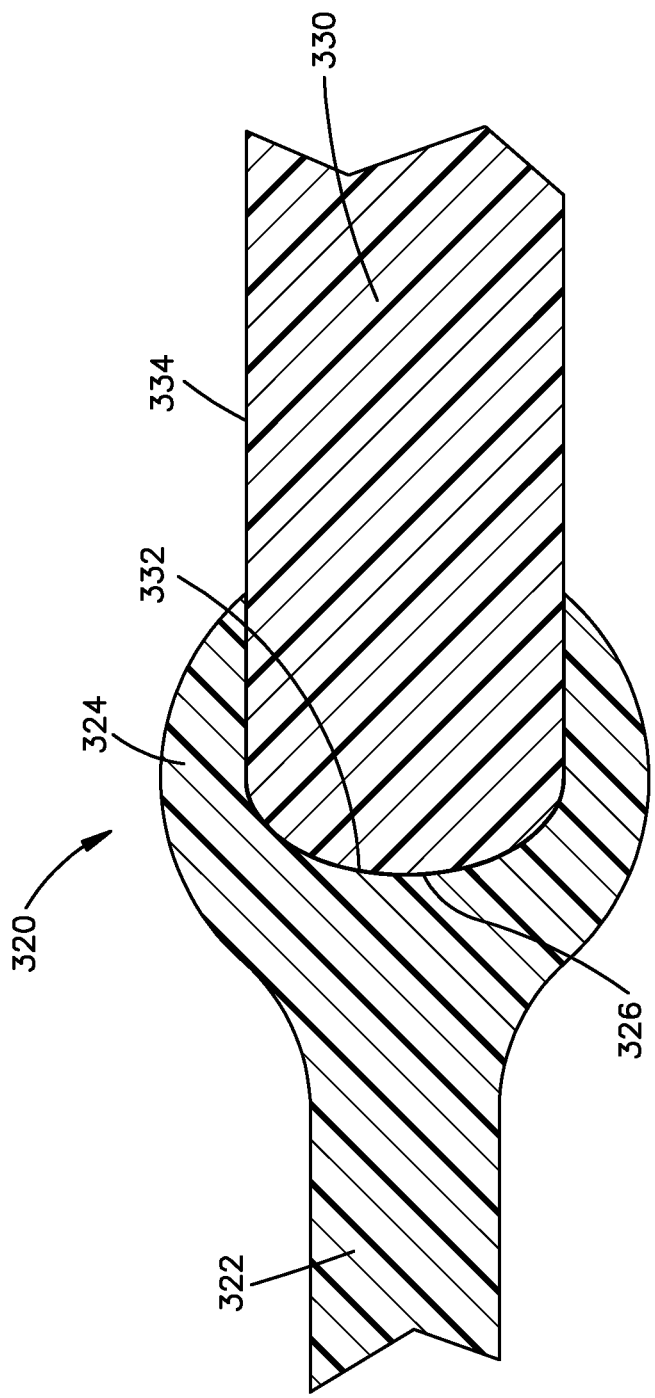
FIG. 6C is an enlarged view of portions of the deployment ramp of FIG. 6B.

Also, according to the present invention, the co-extruded construction of the deployment ramp 200 allows the connections 210 and 211 to be enhanced in terms of strength and reliability. This enhanced construction of the connections 210 and 211 is illustrated in FIG. 6C. In FIG. 6C, a co-extruded joint or connection 320 is representative of the connection 210 between the fastening portion 224 and the support portion 205. The co-extruded connection 320 is also representative of the connection 211 between the deployment member 220 and the support portion 205.

The co-extruded connection 320 illustrated in FIG. 6C is a tongue and groove type joint that interconnects first and second extruded members 322 and 330. Those skilled in the art will appreciate that, with regard to the connection 210, the first and second members 322 and 330 may be representative of the fastening portion 224 and support portion 205, respectively, or vice versa. Those skilled in the art will also appreciate that, with regard to the connection 211, the first and second members 322 and 330 may be representative of the deployment member 220 and support portion 205, respectively, or vice versa.

The connection 320 may include an enlarged portion of either the first extruded member 322 or the second extruded member 330 or an enlarged portion separate from the first and second extruded members. For example, in FIG. 6C, the connection 320 constitutes a portion 324 of the first extruded member 322 that includes a longitudinal groove 326 that receives a longitudinal edge 332 and peripheral surface(s) 334 of the second extruded member. Alternatively, the connection 320 may constitute a portion of the second extruded member 330 that includes a longitudinal groove that receives a longitudinal edge and peripheral surface(s) (not shown) of the first extruded member 322. The connection 320 may have a bulbous configuration when viewed in cross-section. Those having skill in the art, however, will appreciate that the connection may have alternative configurations, such as rectangular, elliptical, etc., when viewed in cross-section.

Since the portion 324 of the first extruded member 322 overlies both the longitudinal edge 332 and portions of the peripheral surface 334 adjacent the longitudinal edge of the second extruded member 330, there is greater surface area connection between the first and second extruded members than other connections such as, for example, an end to end connection between the first and second extruded members. The increased connection surface area between the first and second extruded members 322 and 330 provides a stronger, more reliable connection 320 between the first and second extruded members.

FIGS. 4-5 illustrate the module 150 in the assembled condition in which the upper edge portion 70 of the inflatable curtain 14 and the fastening portion 224 of the mounting member 202 are positioned between the support clip 120 and the inner sheet metal piece 102. The cover 26 (not shown in FIGS. 4-5) could also have a portion positioned between the support clip 120 and the inner sheet metal piece 102. To help secure the inflatable curtain 14 and the deployment ramp 200 to the vehicle 12, the support clips 120 may include retention members (not shown) that extend toward each other and that may engage each other through an aperture 242 in the fastening portion 224 and an aperture (not shown) near the upper edge 70 of the inflatable curtain 14. Such a support clip construction is illustrated in FIG. 7A of U.S. Pat. No. 7,182,366 to Enriquez, which is herein incorporated by reference in its entirety. Alternatively or additionally, the fastening portion 224 can be sewn or otherwise secured to the inflatable curtain 14 near the upper edge 70 of the inflatable curtain. The fasteners 152 are passed through the support clip 120 and threaded into the roof rail 100 to secure the module 150 to the vehicle 12.

The module 150, when in the installed condition of FIGS. 1 and 4, extends along the roof rail 100 and along the intersection of the side structure 16 and the roof 18. The vehicle 12 includes a headliner 300 that extends along an inner surface 302 of the roof 18 of the vehicle. The headliner 300 has a portion 304 that extends at an acute angle relative to the roof 18 adjacent the module 150. The portion 304 of the headliner 300 overlies the module 150 and conceals the module in the vehicle 12. A terminal end 306 of the headliner 300 is in abutting engagement with a trim piece 310 (FIG. 4) overlying the B pillar 32. Those having skill in the art will appreciate that the headliner 300 may also abut and engage a trim piece (not shown in FIG. 4, see FIG. 1) overlying the C pillar 34.

Those skilled in the art will recognize that the configuration of the vehicle structure and, thus, the spatial and interconnecting relationships between the vehicle structure (i.e., the side structure 16, roof 18, and roof rail 100) and the headliner 300, trim piece 310, and module 150, may vary depending upon the particular design of the vehicle 12. Therefore, it should be recognized that the vehicle structure illustrated in FIGS. 4-5 and the spatial and interconnecting relationships between the vehicle structure and the headliner 300, the trim pieces 310 and 312, and the module 150 are for illustrative purposes and may vary without departing from the spirit of the present invention.

The vehicle 12 includes a sensor mechanism 250 (shown schematically in FIGS. 1 and 2) for sensing the occurrence of an event for which inflation of the inflatable curtain 14 is desired, such as a side impact to the vehicle 12 and/or a vehicle rollover. Upon sensing the occurrence of such an event, the sensor mechanism 250 provides an electrical signal over lead wires 252 to the inflator 24. The electrical signal causes the inflator 24 to be actuated in a known manner. The inflator 24, when actuated, discharges fluid under pressure into the inflatable curtain 14.

The inflatable curtain 14 inflates under the pressure of the inflation fluid from the inflator 24. This causes the cover 26 to open, which permits the curtain 14 to inflate away from the roof 18 in a downward direction as shown in the drawings and in a downward direction with respect to the direction of forward travel of the vehicle 12 into the position illustrated in FIGS. 2 and 5.

The inflatable curtain 14, when inflated, extends along the side structure 16 of the vehicle 12 and is positioned between the side structure and any occupant 13 of the vehicle. The inflatable curtain 14 covers portions of the vehicle side structure that extend between the A pillar 30 and the C pillar 34 of the vehicle 12 and may overlie portions of the A pillar, C pillar, and the B pillar 32 of the vehicle. The inflatable curtain 14, when inflated, may be positioned between the vehicle side structure 16 and the front and rear vehicle seating 44 and 46. The inflatable curtain 14, when inflated, helps to protect a vehicle occupant 13 in the event of a vehicle rollover or a side impact to the vehicle 12. The inflatable curtain 14, when inflated, also helps to absorb the energy of impacts with the curtain and helps to distribute the impact energy over a large area of the curtain.

Those skilled in the art will appreciate that the extent and coverage of the inflatable curtain 14 in the vehicle 12 may vary. For example, the extent and coverage of the inflatable curtain 14 may vary depending on a variety of factors, such as the architecture of the vehicle 12, the position of the inflatable curtain in the vehicle, and the desired extent or coverage of the inflatable curtain.

Referring to FIGS. 4 and 5, the deployment ramp 200 helps to deflect or otherwise direct the inflatable curtain 14 to inflate inboard of the trim piece 310, between the trim piece and occupants of the vehicle 12. During inflation of the inflatable curtain 14, the flexible deployment member 220 permits the deployment ramp 200 to move from the stored position of FIG. 4 toward the deployed position of FIG. 5. The construction of the deployment member 220 is sufficiently resilient and flexible so as to permit substantially unrestricted downward movement of the deployment member. This allows the deployment member 220 to reach the deployed position quickly and with little resistance so that the inflatable curtain 14 may also deploy quickly and with little or no resistance. The deployment member 220, when deployed, extends inboard of the trim piece 310 and overlies the area where the trim piece and the side structure 16 converge.

The deployment ramp 200 therefore provides a barrier between the inflatable curtain 14 and the trim piece 310 and, thus, helps prevent the curtain from getting caught on the trim piece or inflating between the trim piece and the side structure 16. The deployment ramp 200 directs the inflatable curtain 14 to deploy in an inboard direction (i.e., to the left as viewed in FIGS. 3-5) around and inboard of the trim piece 310. As shown in FIG. 5, the deployment member 220 may bend or flex under the force of the inflated curtain 14. Even under such bending or flexure, however, the deployment member 220 is of sufficient rigidity to direct the inflatable curtain 14 inboard of the trim piece 310.

From the above description of the invention, those skilled in the art will perceive improvements, changes and modifications. For example, alternative flexible materials, such as plastic films could be used to construct the deployment member. Alternative rigid materials, such as metals or composites, could be used to construct the mounting member. Such improvements, changes and modifications within the skill of the art are intended to be covered by the appended claims.

Having described the invention, the following is claimed:

1. An apparatus for helping to protect an occupant of a vehicle that has a roof, a side structure, and a trim piece overlying the side structure, the apparatus comprising:
an inflatable curtain that is inflatable away from the vehicle roof to a position adjacent the side structure of the vehicle; and
a deployment ramp comprising:
a mounting member for helping to support the inflatable curtain in a stored condition;
a deployment member for helping to direct the inflatable curtain to deploy inboard of the trim piece; and
a co-extruded joint interconnecting the mounting member with the deployment member.

2. The apparatus recited in claim 1, wherein the co-extruded joint between the deployment member and the mounting member is a tongue and groove joint.

3. The apparatus recited in claim 1, wherein the mounting member further includes a fastening portion for fastening the deployment ramp to the vehicle and a co-extruded joint that interconnects the fastening portion with the mounting member.

4. The apparatus recited in claim 3, wherein stitching connects the fastening portion to the inflatable curtain.

5. The apparatus recited in claim 3, wherein the co-extruded joint between the fastening portion and the support portion is a tongue and groove joint.

6. The apparatus recited in claim 3, wherein the fastening portion and the support portion are constructed of different elastomeric materials, the elastomeric material used to construct the support portion having strength and rigidity properties greater than those of the elastomeric material used to construct the fastening portion.

7. The apparatus recited in claim 1, wherein the mounting member and the deployment member are constructed of different elastomeric materials.

8. The apparatus recited in claim 7, wherein the elastomeric material of the mounting member is fiber reinforced polypropylene.

9. The apparatus recited in claim 1, wherein the support portion includes a projection that extends into an opening in the vehicle for securing the deployment ramp to the vehicle.

10. An apparatus for helping to protect an occupant of a vehicle that has a roof, a side structure, and a trim piece overlying the side structure, the apparatus comprising:
    an inflatable curtain that is inflatable away from the vehicle roof to a position adjacent the side structure of the vehicle; and
    a deployment ramp comprising:
    a mounting member including a support portion having first and second longitudinal edge portions and a fastening portion secured to the second longitudinal edge portion, the fastening portion being stitched to the inflatable curtain, the support portion including a projection between the first and second longitudinal edge portions for securing the deployment ramp to the vehicle;
    a deployment member for directing the inflatable curtain to deploy inboard of the trim piece; and
    a joint comprising co-extruded portions of the mounting member and the deployment member to interconnect the mounting member and the deployment member.

11. The apparatus recited in claim 10, wherein the co-extruded joint between the deployment member and the support portion is a tongue and groove joint.

12. The apparatus recited in claim 10, wherein the mounting member includes a joint comprising co-extruded portions of the fastening portion and the second longitudinal edge portion of the support portion to interconnect the fastening portion and the support portion.

13. The apparatus recited in claim 12, wherein the co-extruded joint between the fastening portion and the support portion is a tongue and groove joint.

14. The apparatus recited in claim 10, wherein the support portion and the deployment member are constructed of different elastomeric materials.

15. The apparatus recited in claim 12, wherein the fastening portion and the support portion are constructed of different elastomeric materials.

16. The apparatus recited in claim 10, wherein the elastomeric material of the support portion is fiber reinforced polypropylene.

17. A deployment ramp for an inflatable curtain, the deployment ramp comprising:
    a first portion constructed with a first material;
    a second portion constructed with a second material different than the first material; and
    a joint interconnecting the first and second portions, the joint comprising co-extruded portions of the first and second portions.

18. The deployment ramp recited in claim 17, wherein the first portion and the second portion are constructed of different elastomeric materials, the elastomeric material used to construct the first portion having strength and rigidity properties greater than those of the elastomeric material used to construct the second portion.

19. The deployment ramp recited in claim 18, wherein the elastomeric material of the first portion is fiber reinforced polypropylene.

20. The deployment ramp recited in claim 18, wherein the elastomeric material of the second portion is a thermoplastic olefinic elastomer.

21. The deployment ramp recited in claim 17, wherein the first portion is a mounting member for helping to support the inflatable curtain in a stored condition.

22. The deployment ramp recited in claim 21, wherein the second portion is a deployment member for helping to direct the inflatable curtain to deploy inboard of a vehicle trim piece.

23. The deployment ramp recited in claim 17, where the co-extruded joint between the first portion and the second portion is a tongue and groove joint.

24. The deployment ramp recited in claim 23, wherein the material of one of the first and second portions engages a terminal edge of a longitudinal edge portion of the other of first and second portions and extends partially along opposite surfaces of the longitudinal edge portion.

25. The deployment ramp recited in claim 17, wherein the co-extruded joint between the first portion and the second portion is formed along co-extruded longitudinal edge portions of the first and second portions.

26. The deployment ramp recited in claim 17, wherein the ramp is adapted to be positioned adjacent a roof rail of a vehicle.

\* \* \* \* \*